US012811724B2

(12) United States Patent
Moyal et al.

(10) Patent No.: US 12,811,724 B2
(45) Date of Patent: Nov. 24, 2026

(54) EFFICIENT END-TO-END CREDIT REQUESTOR-RESPONDER SYSTEM

(71) Applicant: MELLANOX TECHNOLOGIES, LTD., Yokneam (IL)

(72) Inventors: Roee Moyal, Yokneam Illit (IL); Gil Kremer, Hadera (IL); Ortal Ben Moshe, Ein HaEmek (IL); Ariel Shahar, Jerusalem (IL)

(73) Assignee: Mellanox Technologies, Ltd, Yokneam (IL)

( * ) Notice: Subject to any disclaimer, the term of this patent is extended or adjusted under 35 U.S.C. 154(b) by 517 days.

(21) Appl. No.: 18/351,544

(22) Filed: Jul. 13, 2023

(65) Prior Publication Data

US 2025/0023668 A1 Jan. 16, 2025

(51) Int. Cl.

| | |
|---|---|
| ***H04L 47/12*** | (2022.01) |
| ***H04L 1/08*** | (2006.01) |
| ***H04L 1/1607*** | (2023.01) |
| ***H04L 47/34*** | (2022.01) |

(52) U.S. Cl.

CPC .............. *H04L 1/1621* (2013.01); *H04L 1/08* (2013.01); *H04L 47/34* (2013.01)

(58) Field of Classification Search

CPC ....... H04L 1/08; H04L 1/1621; H04L 1/1671; H04L 47/34

See application file for complete search history.

(56) References Cited

U.S. PATENT DOCUMENTS 6,243,358 B1 * 6/2001 Monin ................ H04L 12/5602 370/235
6,922,408 B2 7/2005 Bloch et al.
7,461,210 B1 12/2008 Wentzlaff et al.
(Continued)

FOREIGN PATENT DOCUMENTS

CN 107153624 B 9/2017
DE 102021209842 A1 3/2022

OTHER PUBLICATIONS

Infiniband Trade Association, "InfiniBandTM Architecture Specification", vol. 1, Release 1.3, pp. 1-1842, Mar. 3, 2015.
(Continued)

*Primary Examiner* — Phuc H Tran
(74) *Attorney, Agent, or Firm* — Meitar Patents LTD.; Daniel Kligler

(57) ABSTRACT

In one embodiment, a first network device includes a host interface to receive messages from a host device, packet processing circuitry to send a batch of the messages to a second network device without waiting for an acknowledgement receipt from the second network device after sending each message, one message in the batch having a maximum message sequence number (MSN), receive a given acknowledgement receipt from the second network device indicating that all the messages in the batch have been received and including credit data indicating that there is no space in a receive work queue of the second network device for receiving an additional message, and send the additional message having an MSN greater than the maximum MSN to the second network device responsively to receiving the given acknowledgement receipt and based on the credit data indicating that there is no space in the receive work queue.

24 Claims, 8 Drawing Sheets

(56) References Cited

U.S. PATENT DOCUMENTS

| | | | |
|---|---|---|---|
| 7,539,845 | B1 | 5/2009 | Wentzlaff et al. |
| 7,620,791 | B1 | 11/2009 | Wentzlaff et al. |
| 7,624,248 | B1 | 11/2009 | Wentzlaff et al. |
| 7,668,979 | B1 | 2/2010 | Wentzlaff |
| 7,774,579 | B1 | 8/2010 | Wentzlaff et al. |
| 7,793,074 | B1 | 9/2010 | Wentzlaff et al. |
| 7,805,577 | B1 | 9/2010 | Mattina et al. |
| 8,127,111 | B1 | 2/2012 | Wentzlaff et al. |
| 8,190,855 | B1 | 5/2012 | Ramey et al. |
| 8,228,797 | B1 * | 7/2012 | Utley ...................... H04L 47/39 370/414 |
| 8,325,194 | B1 | 12/2012 | Mrazek et al. |
| 8,570,916 | B1 | 10/2013 | Tang et al. |
| 8,620,940 | B1 | 12/2013 | Hostetter et al. |
| 8,635,378 | B1 | 1/2014 | Wentzlaff |
| 8,738,860 | B1 | 5/2014 | Griffin et al. |
| 8,867,356 | B2 | 10/2014 | Bloch et al. |
| 8,924,605 | B2 | 12/2014 | Hayut et al. |
| 8,959,265 | B2 | 2/2015 | Hayut et al. |
| 8,982,703 | B2 | 3/2015 | Almog et al. |
| 8,989,011 | B2 | 3/2015 | Ravid et al. |
| 9,213,652 | B1 | 12/2015 | Miao et al. |
| 9,325,641 | B2 | 4/2016 | Haramaty et al. |
| 9,582,440 | B2 | 2/2017 | Gabbay et al. |
| 9,639,487 | B1 | 5/2017 | Wentzlaff et al. |
| 9,673,934 | B2 | 6/2017 | Mula et al. |
| 9,787,612 | B2 | 10/2017 | Steele et al. |
| 9,934,010 | B1 | 4/2018 | Griffin et al. |
| 10,057,017 | B2 | 8/2018 | Mula et al. |
| 10,200,294 | B2 | 2/2019 | Shpiner et al. |
| 10,230,652 | B2 | 3/2019 | Haramaty et al. |
| 10,339,059 | B1 | 7/2019 | Mattina |
| 10,389,646 | B2 | 8/2019 | Zdornov et al. |
| 10,581,762 | B2 | 3/2020 | Shpiner et al. |
| 10,642,775 | B1 | 5/2020 | Voks et al. |
| 10,831,694 | B1 | 11/2020 | Ganor et al. |
| 10,880,236 | B2 | 12/2020 | Levi et al. |
| 11,082,347 | B2 | 8/2021 | Dearth et al. |
| 11,088,966 | B2 | 8/2021 | Menachem et al. |
| 11,184,439 | B2 | 11/2021 | Eran et al. |
| 11,502,867 | B2 | 11/2022 | Klenk et al. |
| 11,824,791 | B2 | 11/2023 | Mugu et al. |
| 2004/0252685 | A1 | 12/2004 | Kagan et al. |
| 2005/0063305 | A1 | 3/2005 | Wise et al. |
| 2005/0228900 | A1 | 10/2005 | Stuart et al. |
| 2007/0211741 | A1 | 9/2007 | Kagan et al. |
| 2008/0056300 | A1 | 3/2008 | Williams |
| 2011/0128963 | A1 | 6/2011 | Reed et al. |
| 2012/0082164 | A1 | 4/2012 | Bloch et al. |
| 2013/0250760 | A1 | 9/2013 | Sela et al. |
| 2014/0129741 | A1 | 5/2014 | Shahar et al. |
| 2014/0208094 | A1 | 7/2014 | Rajsic et al. |
| 2015/0103667 | A1 | 4/2015 | Elias et al. |
| 2015/0212817 | A1 | 7/2015 | Raikin et al. |
| 2016/0021016 | A1 | 1/2016 | Haramaty et al. |
| 2016/0028613 | A1 | 1/2016 | Haramaty et al. |
| 2016/0285776 | A1 | 9/2016 | Gaist et al. |
| 2017/0094593 | A1 | 3/2017 | Deng et al. |
| 2017/0289066 | A1 | 10/2017 | Haramaty et al. |
| 2018/0019947 | A1 | 1/2018 | Shpiner et al. |
| 2018/0026878 | A1 | 1/2018 | Zahavi et al. |
| 2020/0177521 | A1 | 6/2020 | Blumrich et al. |
| 2021/0006502 | A1 | 1/2021 | Zhou et al. |
| 2021/0250300 | A1 | 8/2021 | Mula et al. |
| 2022/0116473 | A1 | 4/2022 | Levi et al. |
| 2022/0311715 | A1 | 9/2022 | Schubert et al. |
| 2022/0358002 | A1 | 11/2022 | Zhong et al. |
| 2023/0101268 | A1 | 3/2023 | Zolotow et al. |
| 2023/0344769 | A1 * | 10/2023 | Tabatabaee ............. H04L 47/12 |
| 2023/0353499 | A1 | 11/2023 | Liss et al. |
| 2025/0071769 | A1 * | 2/2025 | Wu ................... H04W 52/0241 |

OTHER PUBLICATIONS

U.S. Appl. No. 17/730,246 Office Action dated Nov. 6, 2023.
Menes et al., U.S. Appl. No. 18/120,822, filed Mar. 13, 2023.

* cited by examiner

EFFICIENT END-TO-END CREDIT REQUESTOR-RESPONDER SYSTEM

FIELD OF THE INVENTION

The present invention relates to computer systems, and in particular, but not exclusively, to requestor-responder systems.

BACKGROUND

For each message that a requestor device sends to a responder device over a network, the responder device needs to buffer the received message and process the received message. End-to-end credits may be utilized to prevent buffer overflow in the responder device by the responder device informing the requestor device about the buffer status using credits. In some systems, the responder device manages some pointers, such as producer index Pi (being the amount of work queue elements (WQEs) in the receive work queue), consumer index Ci (being the amount of WQEs consumed by received messages), and the message sequence number (MSN) of the last message for which receipt has been completed. The responder provides the pointer to the requestor device and the requestor device knows how many messages can be sent to the responder device without causing buffer overflow.

Each time the responder device consumes a WQE, the responder device increases the consumer index by 1. Software (e.g., on a host device) can increase the memory allocated to the responder device (e.g., by posting one or more additional WQEs to the responder device receive work queue) and the responder increases the producer index accordingly. The available credits are then given by the producer index less the consumer index. The requestor and responder devices keep track of the MSNs of sent and received messages, respectively. When a new message is received and consumes a WQE, the Ci is increased by 1 and the MSN is increased by 1. Upon safely receiving a message, the responder device responds to the requestor device with an acknowledgement of the received message and the available credits (based on the producer and consumer index) and the MSN of the last message for which receipt has been completed.

SUMMARY

There is provided in accordance with an embodiment of the present disclosure, a system including a first network device, which includes a host interface to receive messages from a host device, a network interface to provide a connection to a second network device over a packet data network, and packet processing circuitry to prepare the messages for sending to the second network device over the packet data network, send a batch of the messages to the second network device without waiting for an acknowledgement receipt from the second network device after sending each of the messages in the batch before sending a next one of the messages in the batch, one of the messages in the batch having a maximum message sequence number (MSN), receive a given acknowledgement receipt from the second network device indicating that all the messages in the batch have been received by the second network device and including credit data indicating that there is no space in a receive work queue of the second network device for receiving an additional message, and send the additional message having an MSN greater than the maximum MSN to the second network device responsively to receiving the given acknowledgement receipt and based on the credit data indicating that there is no space in the receive work queue of the second network device for receiving the additional message.

Further in accordance with an embodiment of the present disclosure each of the messages in the batch of the messages consume work queue elements in a receive work queue of the second network device.

Still further in accordance with an embodiment of the present disclosure the packet processing circuitry is configured to receive a single acknowledgement receipt for all the messages in the batch.

Additionally in accordance with an embodiment of the present disclosure the packet processing circuitry is configured to resend the additional message to the second network device intermittently.

Moreover in accordance with an embodiment of the present disclosure, the system includes the second network device including a network interface to provide a connection to the first network device over the packet data network, and packet processing circuitry to receive the messages from the first network device, process the messages received from the first network device, maintain a cyclic receive work queue including work queue elements (WQEs) that are consumed in order, track available ones of the WQEs, assign the messages to the work queue elements so that the WQEs are consumed by the messages in an order that the messages are received by the second network device, scatter the messages to a memory, and generate completion queue elements (CQEs) for the WQEs and add the CQEs to a completion queue, wherein the CQEs provide the respective locations in the memory where respective ones of the messages were scattered.

Further in accordance with an embodiment of the present disclosure the packet processing circuitry of the second network device is configured to process the messages of the batch out-of-order, the messages of the batch including a first message and a second message, the first message having a lower MSN than the second message, receive the second message before the first message, assign the second message to a first one of the WQEs, scatter the second message to the memory, receive the first message, assign the first message to a second one of the WQEs, and scatter the first message to the memory.

Still further in accordance with an embodiment of the present disclosure the packet processing circuitry of the second network device is configured to process the messages of the batch in order so that if one of the messages is received out-of-order the MSN, the out-of-order message is dropped.

There is also provided in accordance with another embodiment of the present disclosure a first network device, including a network interface to provide a connection to a second network device over a packet data network, and packet processing circuitry to receive a batch of messages from the second network device, assign the messages to work queue elements (WQEs), generate completion queue elements (CQEs) for the WQEs, and track consumed WQEs still waiting for CQEs, being ones of the WQEs consumed with ones of the messages and still waiting for CQEs to be generated for the consumed WQEs.

Additionally in accordance with an embodiment of the present disclosure the packet processing circuitry is configured to maintain a cyclic receive work queue including the WQEs that are consumed in order, assign the messages to the work queue elements so that the WQEs are consumed by the messages in an order that the messages are received by the packet processing circuitry, scatter the messages to a memory, add the CQEs to a completion queue, wherein the CQEs provide respective locations in the memory where respective ones of the messages were scattered, track free WQEs which are not consumed with messages, compute credit data including available receive work queue credits based on the free WQEs plus the consumed WQEs still waiting for CQEs, and send the credit data to the second network device via the network interface.

Moreover, in accordance with an embodiment of the present disclosure the packet processing circuitry is configured to generate an acknowledgement receipt including the credit data and indicating that at least one of the messages has been received by the packet processing circuitry, and send the acknowledgement receipt to the second network device via the network interface.

Further in accordance with an embodiment of the present disclosure the packet processing circuitry is configured to generate the acknowledgement receipt to include a highest message sequence number (MSN) of the messages which have an associated one of the CQEs.

Still further in accordance with an embodiment of the present disclosure the packet processing circuitry is configured to process the messages of the batch out-of-order, the messages of the batch including a first message and a second message, the first message having a lower message sequence number (MSN) than the second message, receive the second message before the first message, assign the second message to a first one of the WQEs, scatter the second message to the memory, receive the first message, assign the first message to a second one of the WQEs, and scatter the first message to the memory.

Additionally in accordance with an embodiment of the present disclosure the packet processing circuitry is configured to generate the CQEs for the WQEs an order of the MSNs of the messages that have consumed the WQEs.

Moreover, in accordance with an embodiment of the present disclosure the packet processing circuitry includes a first hardware counter configured to track the free WQEs, and a second hardware counter configured to track the consumed WQEs still waiting for CQEs.

There is also provided in accordance with still another embodiment of the present disclosure, a method, including receiving messages from a host device, providing a connection to a network device over a packet data network, preparing the messages for sending to the network device over the packet data network, sending a batch of the messages to the network device without waiting for an acknowledgement receipt from the network device after sending each of the messages in the batch before sending a next one of the messages in the batch, one of the messages in the batch having a maximum message sequence number (MSN), receiving a given acknowledgement receipt from the network device indicating that all the messages in the batch have been received by the network device and including credit data indicating that there is no space in a receive work queue of the network device for receiving an additional message, and sending the additional message having an MSN greater than the maximum MSN to the network device responsively to receiving the given acknowledgement receipt and based on the credit data indicating that there is no space in the receive work queue of the network device for receiving the additional message.

Further in accordance with an embodiment of the present disclosure each of the messages in the batch of the messages consume work queue elements in a receive work queue of the network device.

Still further, in accordance with an embodiment of the present disclosure the receiving the given acknowledgement receipt includes receiving a single acknowledgement receipt for all the messages in the batch.

Additionally in accordance with an embodiment of the present disclosure, the method includes resending the additional message to the network device intermittently.

Moreover in accordance with an embodiment of the present disclosure, the method includes, by the network device receiving the messages, maintaining a cyclic receive work queue including work queue elements (WQEs) that are consumed in order, tracking available ones of the WQEs, assigning the messages to the work queue elements so that the WQEs are consumed by the messages in an order that the messages are received by the network device, scattering the messages to a memory, generate completion queue elements (CQEs) for the WQEs, and adding the CQEs to a completion queue, wherein the CQEs provide the respective locations in the memory where respective ones of the messages were scattered.

There is also provided in accordance with still another embodiment of the present disclosure a method, including providing a connection to a network device over a packet data network, receiving a batch of messages from the network device, assigning the messages to work queue elements (WQEs), generating completion queue elements (CQEs) for the WQEs, and tracking consumed WQEs still waiting for CQEs, being ones of the WQEs consumed with ones of the messages and still waiting for CQEs to be generated for the consumed WQEs.

Further in accordance with an embodiment of the present disclosure, the method includes maintaining a cyclic receive work queue including the WQEs that are consumed in order, assigning the messages to the work queue elements so that the WQEs are consumed by the messages in an order that the messages are received, scattering the messages to a memory, adding the CQEs to a completion queue, wherein the CQEs provide respective locations in the memory where respective ones of the messages were scattered, tracking free WQEs which are not consumed with messages, computing credit data including available receive work queue credits based on the free WQEs plus the consumed WQEs still waiting for CQEs, and sending the credit data to the network device.

Still further in accordance with an embodiment of the present disclosure, the method includes generating an acknowledgement receipt including the credit data and indicating that at least one of the messages has been received, and sending the acknowledgement receipt to the network device.

Additionally in accordance with an embodiment of the present disclosure the generating the acknowledgement receipt includes generating the acknowledgement receipt to include a highest message sequence number (MSN) of the messages which have an associated one of the CQEs.

Moreover in accordance with an embodiment of the present disclosure, the method includes processing the messages of the batch out-of-order, the messages of the batch including a first message and a second message, the first message having a lower message sequence number (MSN) than the second message, receiving the second message before the first message, assigning the second message to a first one of the WQEs, scattering the second message to the memory, receiving the first message, assigning the first message to a second one of the WQEs, and scattering the first message to the memory.

Further in accordance with an embodiment of the present disclosure the generating the CQEs includes generating the CQEs for the WQEs an order of the MSNs of the messages that have consumed the WQEs.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
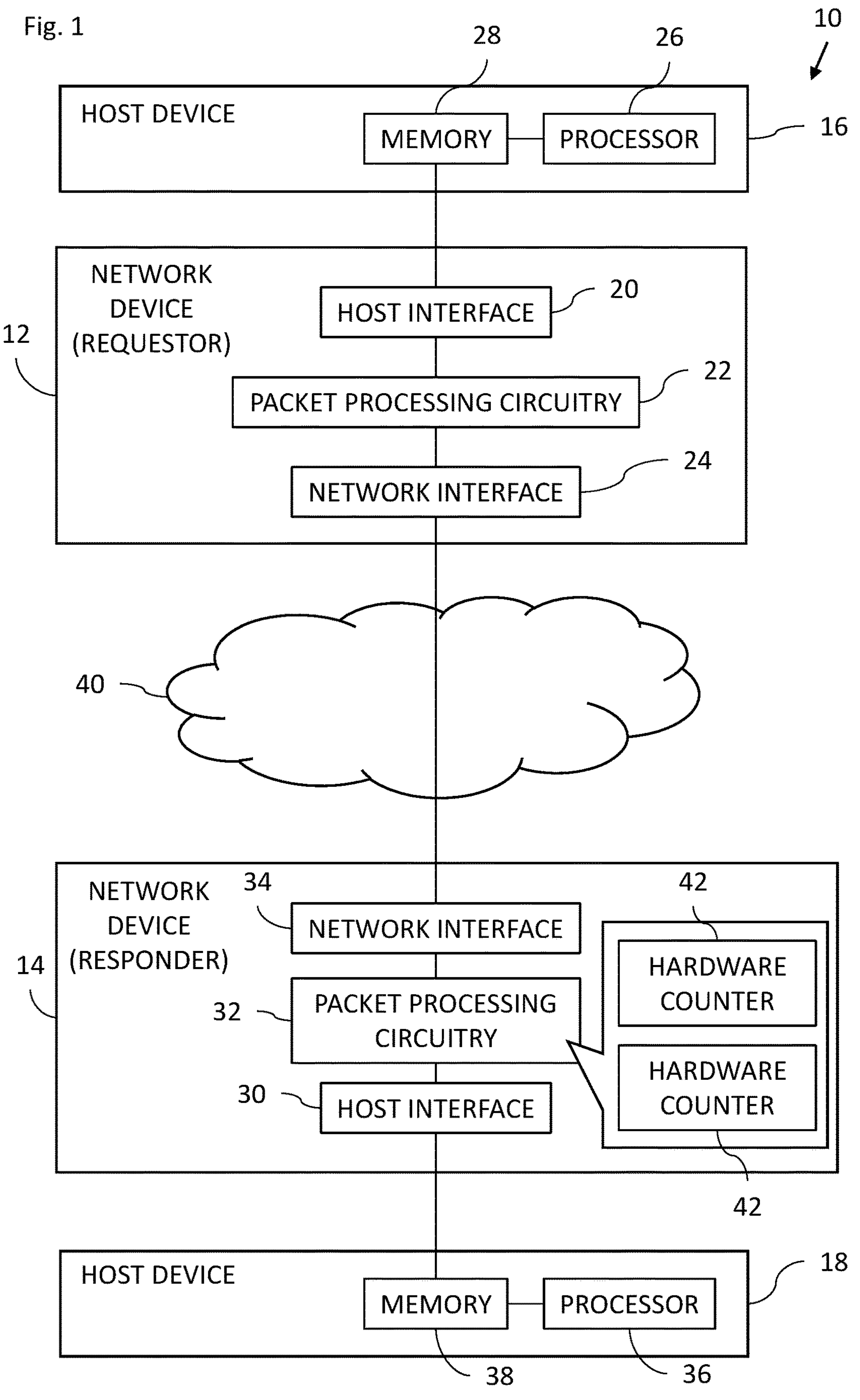
FIG. 1 is a block diagram view of a computer system constructed and operative in accordance with an embodiment of the present invention.

A problem may occur when using credit-based systems. For example, if a requestor device sends a number of messages, e.g., messages 11 to 15, to a responder device, the responder device may send an acknowledgement after processing packet number 15 and indicate that there are zero receive work queue credits available. In a system, where credits are reported in the acknowledgement receipts, the requestor device does not receive another message from the responder device when receive work queue credits are again available. One solution to the above problem is for the requestor device to periodically send an additional message, e.g., message 16, after sending packets 11 to 15, and the additional message may be dropped. If the additional message is received, and not dropped, the responder device responds with an acknowledgement receipt including an indication of available credits. In this manner, available credits become known to the requestor device.

The above solution may be helpful in systems where messages are received and processed in order. For example, message 11 is received and processed before message 12, and if message 12 is received before message 11, message 12 is dropped. In such a case, sending the additional message 16 does not lead to blocking other messages in the receive work queue (as explained in more detail below), as in a system where messages are received and processed in order, if message 16 is received prior to message 15 (or any message with a lower MSN), message 16 will be dropped.

However, in systems where messages may be received out-of-order in a cyclic queue (where when a message arrives it consumes the first available WQE in a cyclical manner), but completions are processed in MSN order (for example, message 12 may be received and added to the receive work queue before message 11, even though message 11 is still completed prior to message 12) a problem may occur as follows. The term "consume", as used in the specification and claims, in all grammatical forms, may include associating a given message with a WQE to process receipt of the given message including scattering the given message to memory based on buffer pointers in the WQE. Once the WQE is consumed by the given message, that WQE cannot be used by another message as the buffer locations are being used by the given message. For example, if messages 11 to 16 are sent from the requestor device to the responder device, and there are 5 available receive work queue credits, if messages with MSN 12, 13, 14, 15 and 16 consume WQEs in the receive work queue, then when the message with MSN 11 arrives, it is dropped, as there is no room in the receive work queue for message with MSN 11. However, none of the other messages with MSN 12-16 can be completed until the message with MSN 11 is completed, resulting in a deadlock.

Therefore, embodiments of the present invention solve at least some of the above drawbacks by sending the additional message (e.g., message with MSN 16) after receiving an acknowledgement receipt(s) indicating that all the prior messages (e.g., messages up to and including MSN 15) have been received. In this manner, the additional message cannot block the other messages from being processed by the responder device.

In some embodiments, the requestor device sends a batch of messages (e.g., messages with MSN 11-15) to the responder device without waiting for an acknowledgement receipt from the responder device after sending each message in the batch before sending a next message in the batch. The requestor device receives an acknowledgement receipt from the responder device indicating that all the messages in the batch (e.g., messages with MSN 11-15) have been received. The acknowledgement receipt includes credit data indicating that there is no space in the receive work queue of the responder device for receiving an additional message. The requestor device sends the additional message (e.g., message with MSN 16) to the responder device responsively to receiving the acknowledgement receipt even though the credit data indicates that there is no space in the receive work queue for receiving the additional message.

The additional message (e.g., message with MSN 16) is repeatedly sent to the responder device until the requestor device receives an acknowledgement receipt from the responder device that the additional message has been received. The acknowledgement receipt for the additional message may include credit data indicating that there is free space in the receive work queue. According to the latest credit data, the requestor device may send another batch of messages to the responder device.

In some systems, acknowledgement receipts are not received unless requested by the requestor device. Therefore, in some embodiments, the requestor device requests an acknowledgement receipt to be provided after the final message in the batch of messages is received by the responder device. It may be assumed that if an acknowledgement receipt for message with MSN X is received, then all the messages with MSN less than X have also been received, even if message with MSN X is received by the responder device prior to a message with MSN less than X.

In some embodiments, the above may also be implemented when messages are received in order so that behavior of the requestor device is consistent whether the responder device processes packets in order or out-of-order.

As previously mentioned, the responder device may receive messages out-of-order in a cyclic queue (where when a message arrives it will consume the first available WQE in a cyclical manner), but completions are processed in MSN order (for example, message 12 may be received and added to the receive work queue before message 11, even though message 11 is still completed prior to message 12).

Therefore, when an out-of-order message arrives, it consumes the first available WQE in the receive work queue and the responder device scatters the data of the received out-of-order message into memory. However, the responder device cannot process a completion for the out-of-order message until the other message(s) (with lower MSNs) arrive and are completed in order. Therefore, in addition to the receive work queue including free WQEs (i.e., WQEs which have not been consumed by received messages), and WQEs associated with completion queue elements (CQEs) (i.e., WQEs consumed with received messages and having associated CQEs), the receive work queue also includes WQEs which are consumed with received messages and still waiting for associated CQEs. This leads to a performance problem based on how available credits are computed and this could lead to the requestor device sending less packets than the responder device can handle. The term "WQE" or work queue element, as used in the specification and claims, may refer to a queue element (e.g., receive queue element or a send queue element). A receive queue WQE may include a buffer pointer indicating where to scatter in memory a message associate with, or to be associated with, the WQE. Once a given WQE is consumed by a given message, the given WQE is not used by another message as the given buffer location(s) assigned to the given WQE is now reserved for the given message.

The term "CQE" or completion queue element, as used in the specification and claims, may refer to a completion entity which is provided to host software to inform the host software that the given message was assigned to the given WQE and was scattered in memory based on buffer pointers in the given WQE. The host software completes handling of the given message and frees up the given buffer location(s) in memory. The given WQE may then be replaced by a new WQE by software in the receive work queue. The new WQE may reuse the given buffer location(s) of the given WQE.

For example, consider a receive work queue having eight WQEs. Messages 1 and 2 are in the queue, and have associated CQEs. Therefore, the MSN tracked by the responder device is equal to 2. The responder device sends an acknowledgement receipt to the requestor device indicating that the MSN is equal to 2 and free credits are equal to 6. In such a case, the requestor device may compute that messages may be sent up to MSN 8.

Then message 4 arrives, but it is not processed (e.g., as message 3 has not yet arrived). Therefore, message 4 consumes a WQE but does not have an associated CQE. If the responder device sends an acknowledgement receipt at this stage, it will include MSN equal to 2 and free credits equal to 5. In such a case, the requestor device may compute that messages may be sent up to MSN 7. So even though the MSN is the same, the free credits have been reduced by one, which erroneously informs the requestor device that there is one less packet that can be transmitted than previously.

Embodiments of the present invention solve at least some of the above drawbacks by tracking the WQEs which are consumed with received messages and still waiting for associated CQEs. The responder device computes available credits based on free WQEs plus WQEs which are consumed with received messages and still waiting for associated CQEs. In the above example, the available credits after receiving message 4 will be equal to the amount of free WQEs (i.e., 5), plus the amount of WQEs which are consumed with received messages and still waiting for associated CQEs (i.e., 1) giving a total of 6 available credits. Therefore, the requestor device correctly computes that messages may be sent up to MSN 8 (i.e., MSN equal to 2 plus available credits of 6).

System Description

Reference is now made to FIG. 1, which is a block diagram view of a computer system 10 constructed and operative in accordance with an embodiment of the present invention. The system 10 includes a requestor network device 12 and a responder network device 14. The system 10 includes a host device 16 connected via a data communication bus to the requestor network device 12, and a host device 18 connected via a data communication bus to the responder network device 14.

The host device 16 includes a processor 26 and a memory 28. The processor 26 prepares messages and provides the messages to the requestor network device 12, for example, via the memory 28. The requestor network device 12 includes a host interface 20, packet processing circuitry 22, and a network interface 24. The host interface 20 is configured to receive the messages from the host device 16 and provide the messages to the packet processing circuitry 22. The packet processing circuitry 22 processes the messages and is described in more detail with reference to FIG. 2. The network interface 24 is configured to provide a connection to the responder network device 14 over a packet data network 40, and send the messages to the responder network device 14.

The responder network device 14 includes a host interface 30, packet processing circuitry 32, and a network interface 34. The network interface 34 is configured to provide a connection to the requestor network device 12 over the packet data network 40 and receive the messages from the requestor network device 12. The packet processing circuitry 32 is described in more detail with reference to FIGS. 3-8. The packet processing circuitry 32 is configured to process the messages and scatter the payload of the messages to a memory 38 of the host device 18. The packet processing circuitry 32 includes two hardware counters 42. One of the hardware counters 42 is configured to track free WQEs, and another one of the hardware counters 42 is configured to track consumed WQEs still waiting for CQEs, described in more detail with reference to FIG. 8. The host device 18 includes a processor 36 and the memory 38.

In practice, some or all of the functions of the packet processing circuitry 22 or packet processing circuitry 32 may be combined in a single physical component or, alternatively, implemented using multiple physical components. These physical components may comprise hard-wired or programmable devices, or a combination of the two. In some embodiments, at least some of the functions of the packet processing circuitry 22, 32 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
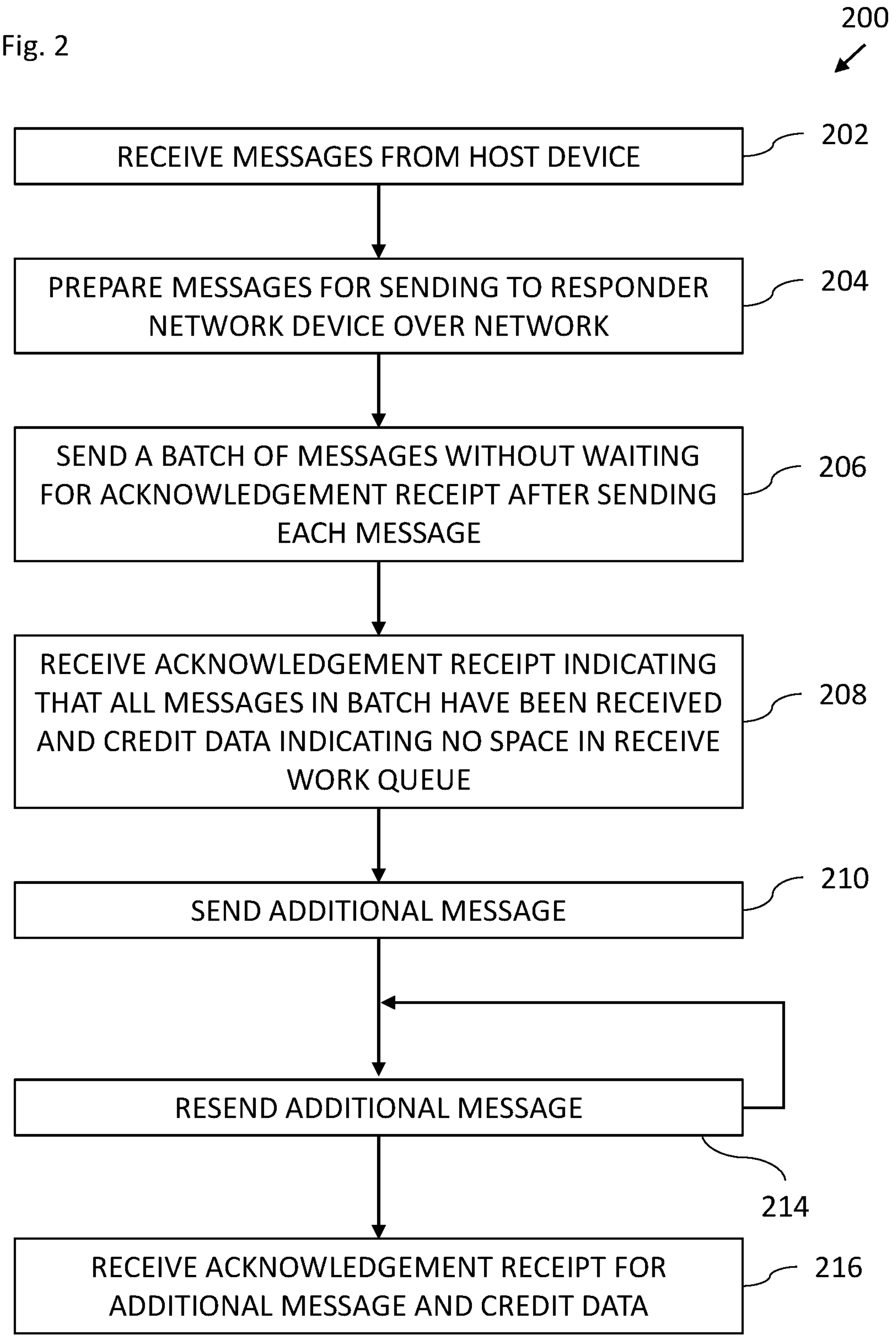
FIG. 2 is a flowchart including steps in a method of operation of a requestor network device in the system of FIG. 1.

Reference is now made to FIG. 2, which is a flowchart 200 including steps in a method of operation of the requestor network device 12 in the system 10 of FIG. 1. The packet processing circuitry 22 of the requestor network device 12 is configured to receive messages from the host device 16 (block 202), and prepare the messages for sending to the responder network device 14 over the packet data network 40 (block 204). The packet processing circuitry 22 of the requestor network device 12 is configured to send a batch of the messages (e.g., messages with MSN 10-15) to the responder network device 14 without waiting for an acknowledgement receipt from the responder network device 14 after sending each of the messages in the batch before sending a next one of the messages in the batch (block 206). One of the messages in the batch (e.g., message with MSN 15) has a maximum message sequence number (MSN).

The packet processing circuitry 22 of the requestor network device 12 is configured to receive a given acknowledgement receipt (e.g., a single acknowledgement receipt for all the messages in the batch of messages or more than one acknowledgement receipt for the messages) from the responder network device 14 indicating that all the messages in the batch have been received by the responder network device 14 and including credit data indicating that there is no space in a receive work queue of the responder network device 14 for receiving an additional message (block 208). The acknowledgement receipt received for the final message in the batch (e.g., message with MSN 15) indicates that all the messages in the batch have been received, even if one or more of the messages in the batch were received after the final message. The packet processing circuitry 22 of the requestor network device 12 is configured to send an additional message having an MSN (e.g., MSN 16) which is greater than the maximum MSN (e.g., MSN 15) to the responder network device 14 responsively to receiving the acknowledgement receipt and based on the credit data indicating that there is no space in the receive work queue of the responder network device 14 for receiving the additional message (block 210).

The packet processing circuitry 22 is configured to resend the additional message to the responder network device 14 intermittently (block 214) if an acknowledgement receipt was not yet received for the additional message. The packet processing circuitry 22 is configured to receive the acknowledgement receipt for the additional message with credit data and the latest MSN completed by the responder network device 14 (block 216).

Figure 3:
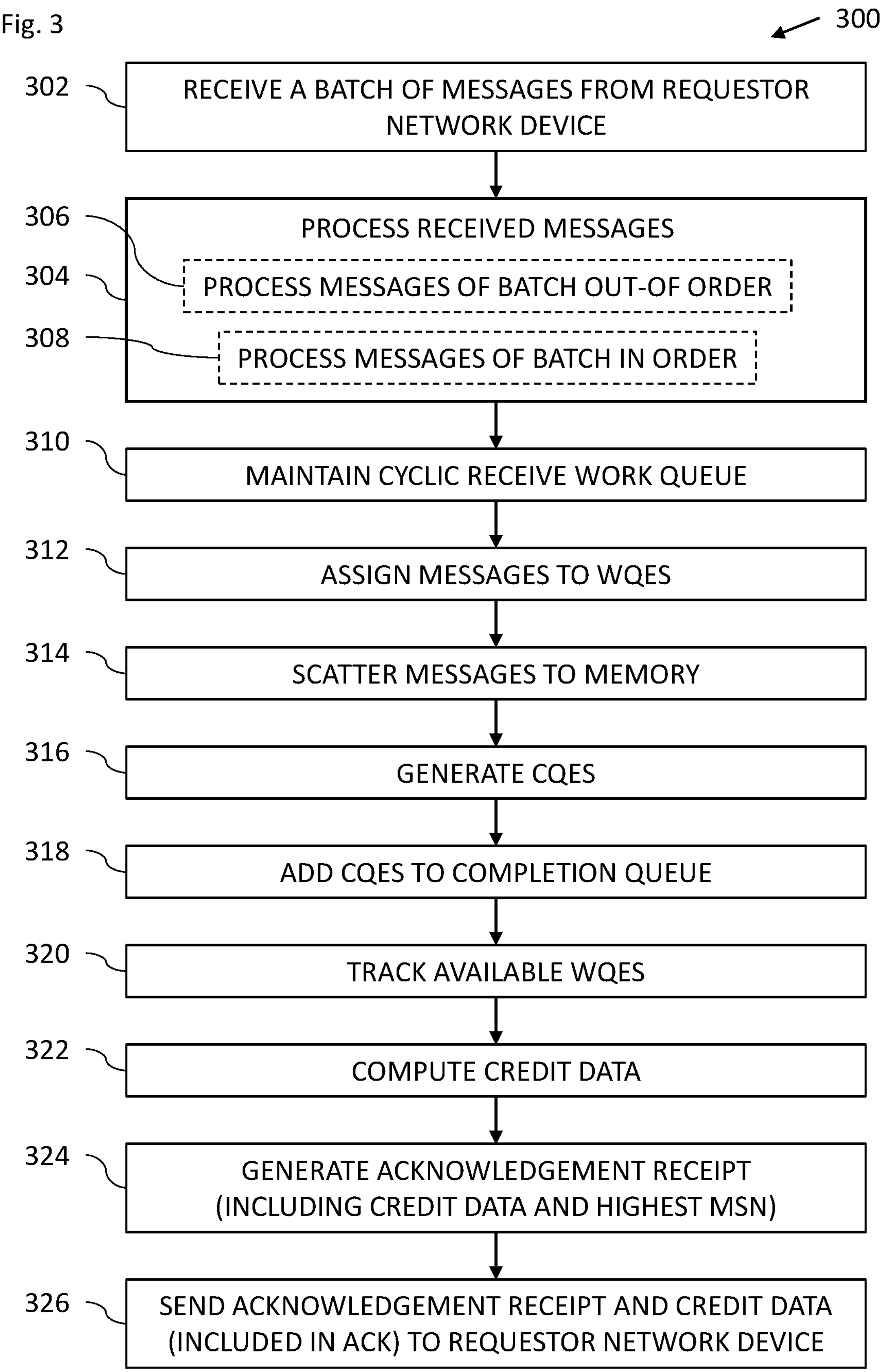
FIG. 3 is a flowchart including steps in a method of operation of a responder network device in the system of FIG. 1.

Reference is now made to FIG. 3, which is a flowchart 300 including steps in a method of operation of the responder network device 14 in the system 10 of FIG. 1. The packet processing circuitry 32 of the responder network device 14 is configured to receive the (batch of) messages from the requestor network device 12 (block 302) and process the messages received from the requestor network device 12 (block 304). In some embodiments, the packet processing circuitry 32 is configured to process the messages (of the batch) out-of-order (block 306) as described in more detail with reference to FIGS. 4 and 5. In some embodiments, the packet processing circuitry 32 is configured to process the messages (of the batch) in order so that if one of the messages is received out-of-order according to the MSN, the out-of-order message is dropped (block 308), as described in more detail with reference to FIG. 6.

The packet processing circuitry 32 is configured to maintain a cyclic receive work queue including work queue elements (WQEs) that are consumed in order (block 310) as described in more detail with reference to FIGS. 5 and 6. The packet processing circuitry 32 is configured to assign the messages (e.g., from the batch) to the work queue elements so that the WQEs are consumed by the messages in an order that the messages are received by the packet processing circuitry 32 (block 312) as described in more detail with reference to FIGS. 5 and 6. In some embodiments, each of the messages in the batch of the messages received from the requestor network device 12 consume work queue elements in the receive work queue of the responder network device 14.

The packet processing circuitry 32 is configured to scatter the messages to the memory 38 of the host device 18 (block 314). The scattering is generally performed according to the order of the WQEs in the receive work queue. The packet processing circuitry 32 is configured to generate completion queue elements (CQEs) for the WQEs (block 316). The CQEs provide the respective locations in the memory 38 where respective messages were scattered. The packet processing circuitry 32 is configured to generate the CQEs for the WQEs according to an order of the MSNs of the messages that have consumed the WQEs, as described in more detail with reference to FIG. 5. The packet processing circuitry 32 is configured to add the CQEs to a completion queue (block 318).

The packet processing circuitry 32 is configured to track available WQEs (block 320) as described in more detail with reference to FIG. 8. The packet processing circuitry 32 is configured to compute credit data based on the available WQEs (block 322). The packet processing circuitry 32 is configured to generate an acknowledgement receipt including the credit data indicating that at least one of the messages has been received by the packet processing circuitry 32. In some embodiments, packet processing circuitry 32 is configured to generate the acknowledgement receipt to include a highest message sequence number (MSN) of the messages which have an associated one of the CQEs (block 324). The packet processing circuitry 32 is configured to send the acknowledgement receipt and the credit data (included in the acknowledgement receipt) to the requestor network device 12 via the network interface 34 (block 326).

Figure 4:
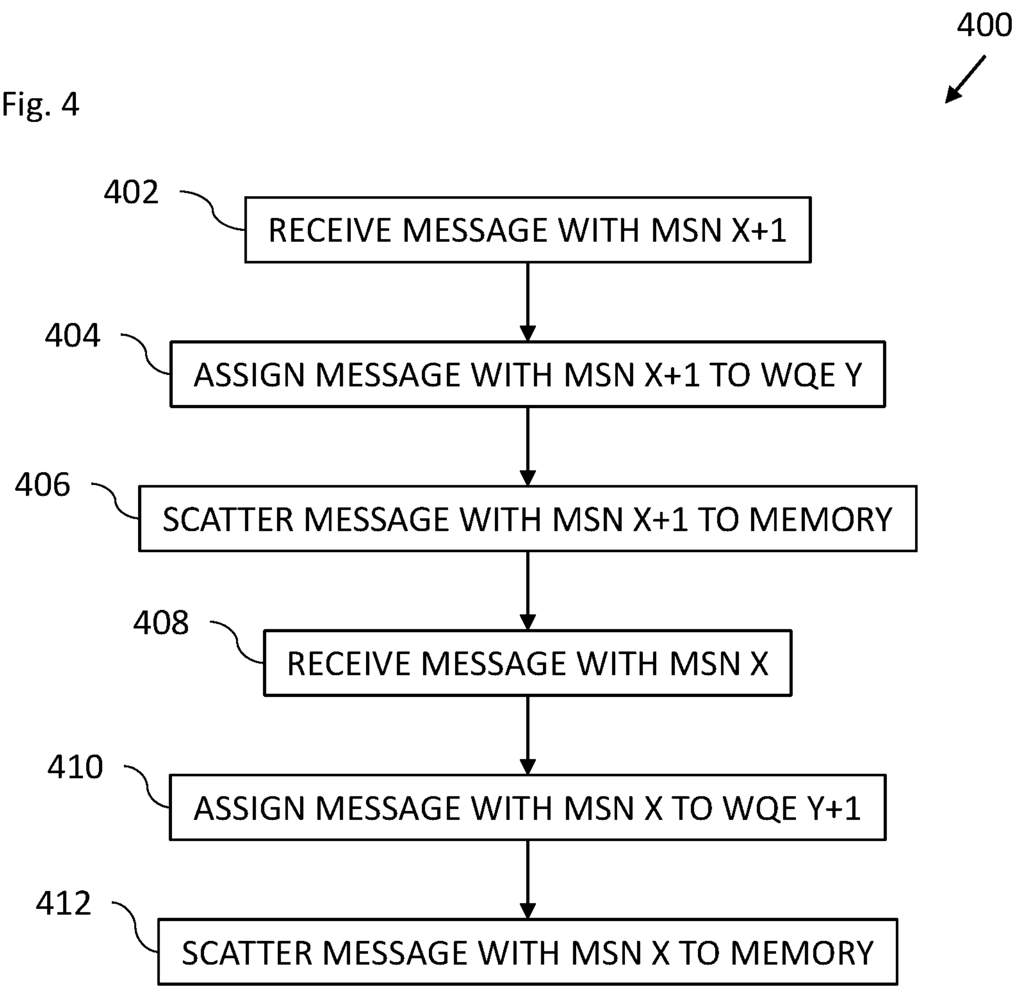
FIG. 4 is a flowchart including steps in a method of processing out-of-order messages in the system of FIG. 1.
Figure 5:
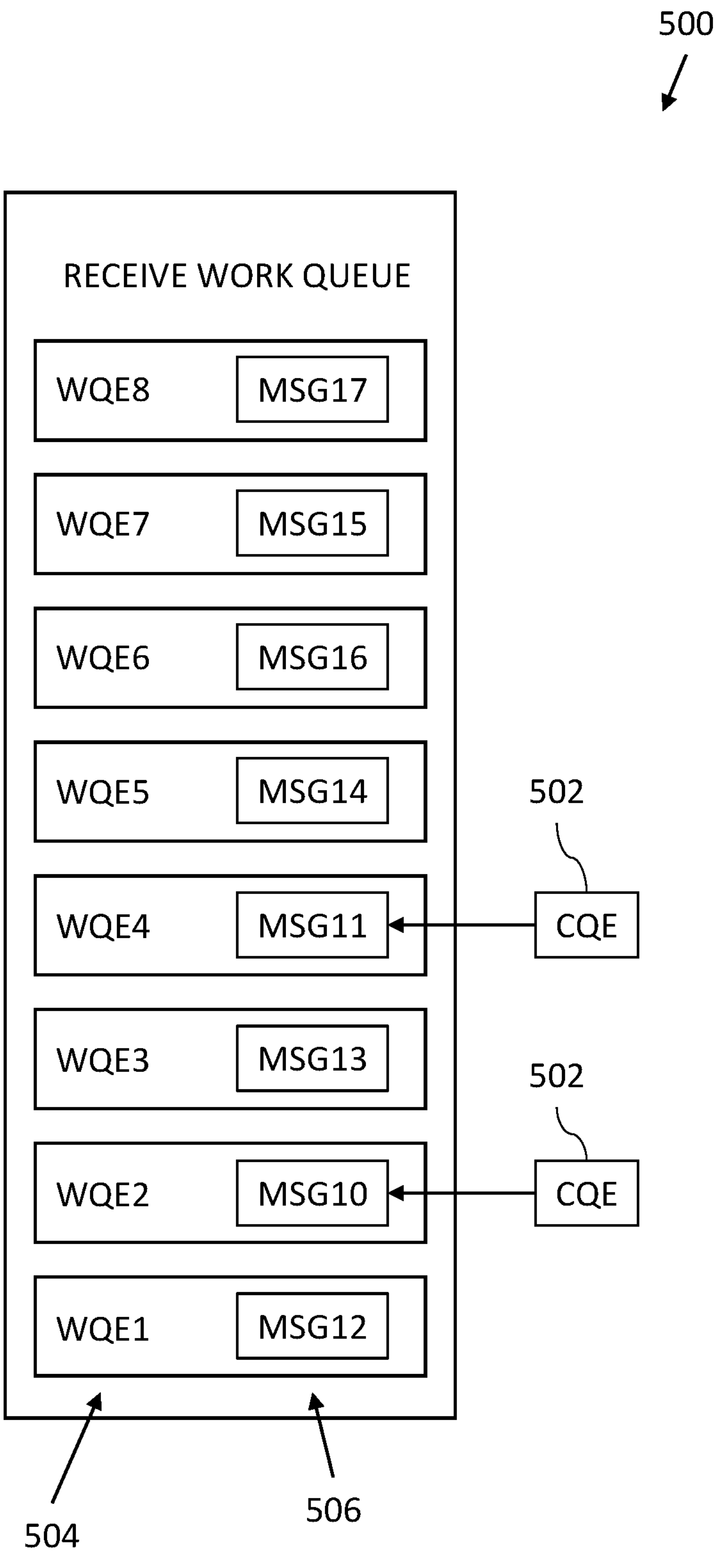
FIG. 5 is a view of a receive work queue being processed out-of-order for use in the system of FIG. 1.

Reference is now made to FIGS. 4 and 5. FIG. 4 is a flowchart 400 including steps in a method of processing out-of-order messages in the system 10 of FIG. 1. FIG. 5 is a view of a receive work queue 500 being processed out-of-order for use in the system 10 of FIG. 1. As previously mentioned, the packet processing circuitry 32 may be configured to process the messages of the batch out-of-order. Let us assume that the messages of the batch include a message with MSN equal to X and another message with MSN equal to X+1, where X is less than X+1. Although, the requestor network device 12 sent message X before message X+1, the responder network device 14 receives message X+1 prior to receiving message X. The process flow may be as follows. The packet processing circuitry 32 is configured to: receive message with MSN of X+1 (block 402); assign message with MSN of X+1 to WQE Y (block 404); scatter message with MSN of X+1 to the memory 38 (block 406); receive message with MSN of X (block 408); assign message with MSN of X to WQE Y+1 (block 410); and scatter message with MSN of X to the memory 38 (block 412). However, the packet processing circuitry 32 is configured to process the CQE of the message with MSN of X prior to the message with MSN of X+1.

FIG. 5 illustrates the above out-of-order processing of WQEs 504 and messages 506. FIG. 5 shows WQE1 consumed by message 12 (MSG12), WQE2 consumed by message 10 (MSG10), WQE3 consumed by message 13 (MSG13), and WQE4 consumed by message 11 (MSG11). In other words, the WQEs are consumed in the order that the messages are received by the packet processing circuitry 32. FIG. 5 also shows that CQEs 502 are generated for message 10, then message 11 before the other messages, even though message 12 is earlier in the receive work queue 500 than message 10, and message 13 is earlier in the receive work queue 500 than message 11.

Figure 6:
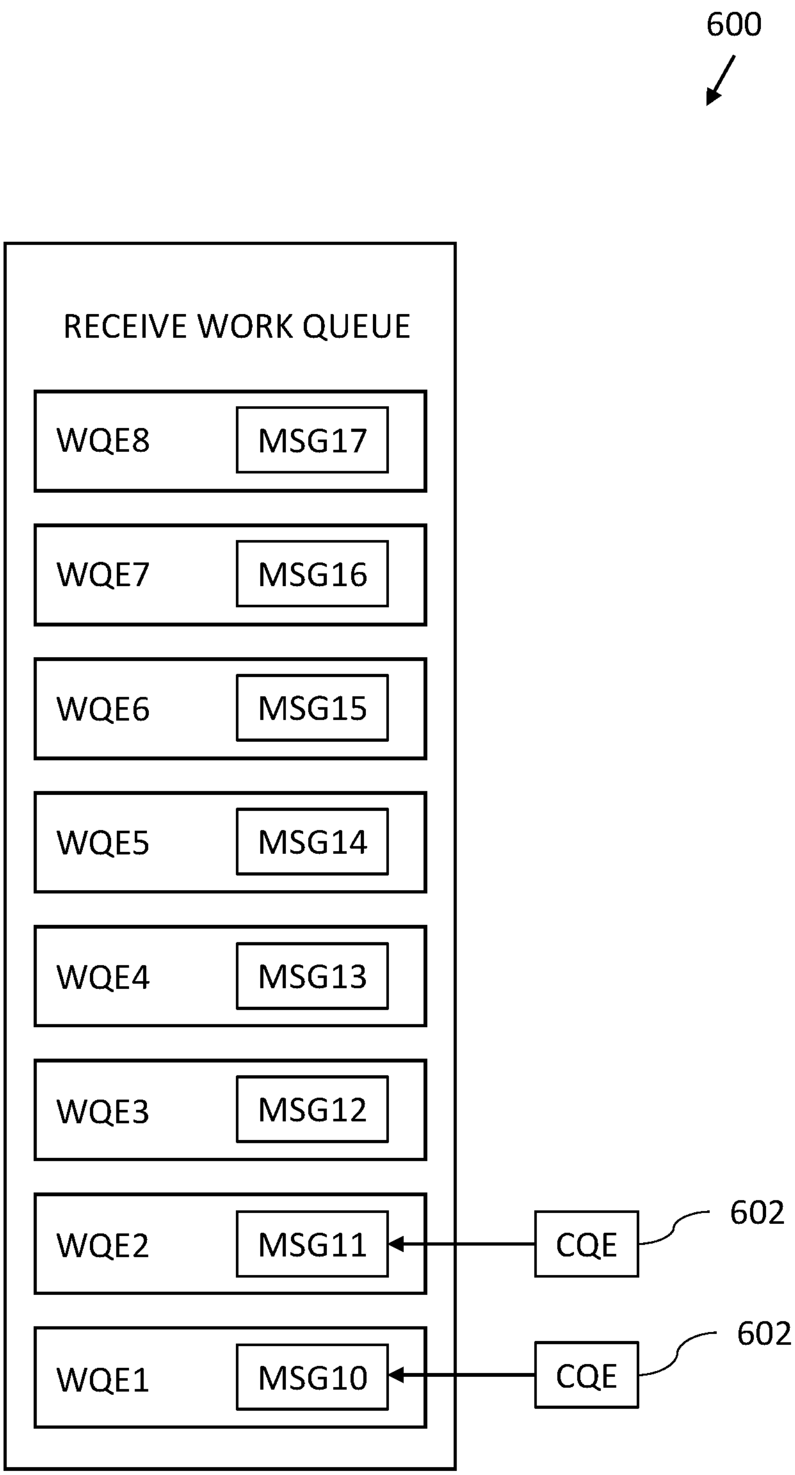
FIG. 6 is a view of a receive work queue being processed in-order for use in the system of FIG. 1.

Reference is now made to FIG. 6, which is a view of a receive work queue 600 being processed in order for use in the system 10 of FIG. 1. FIG. 6 shows that WQEs 1-8 are consumed by messages 10-17 (MSG10 to MSG17), respectively, and in order. If message 11 is received before message 10, message 11 is dropped, for example. Additionally, the packet processing circuitry 32 processes CQEs 602 in MSN order, e.g., message 10, then message 11, etc.

Figure 7:
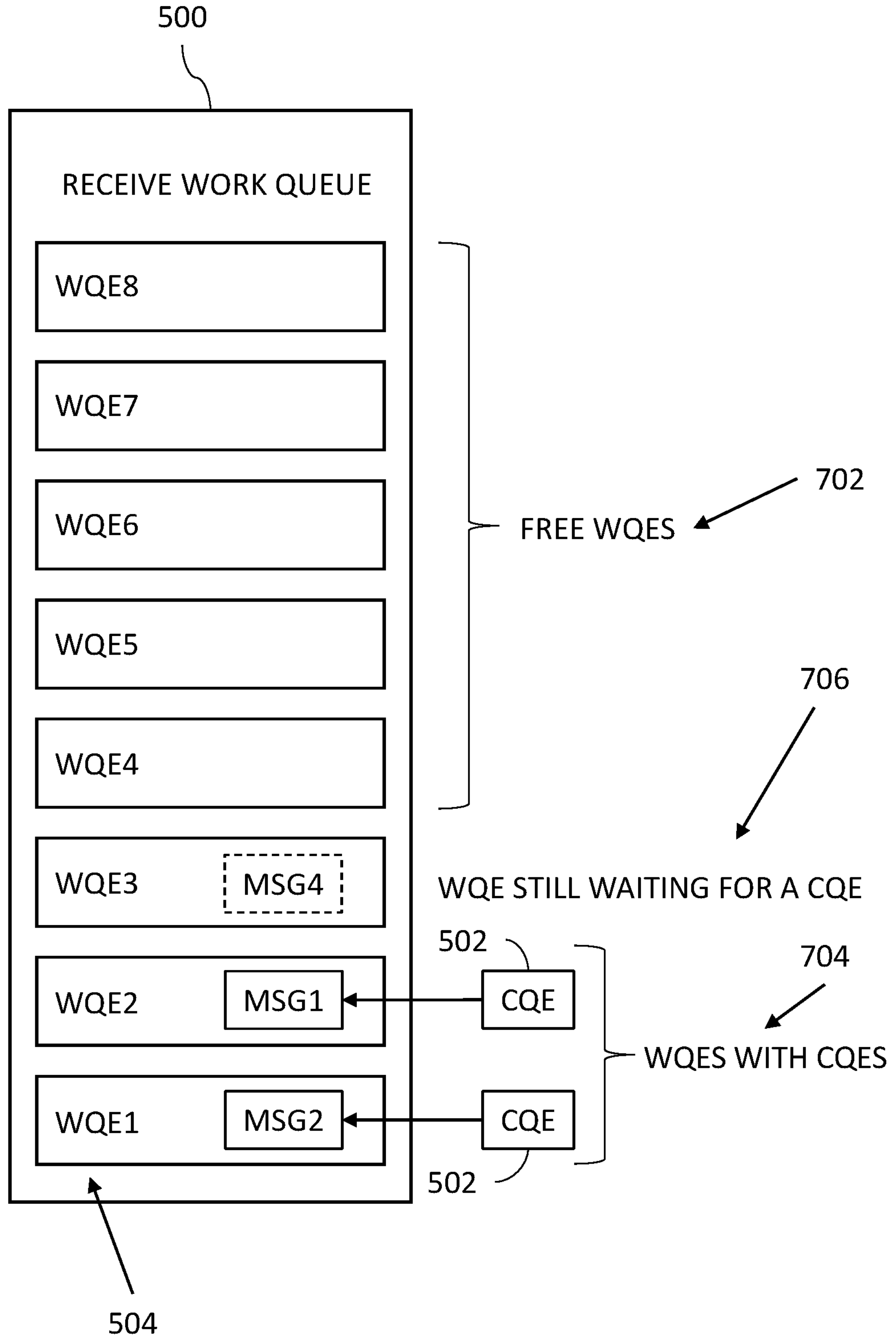
FIG. 7 is a view of a receive work queue used to illustrate computation of available WQEs in the system of FIG. 1.
Figure 8:
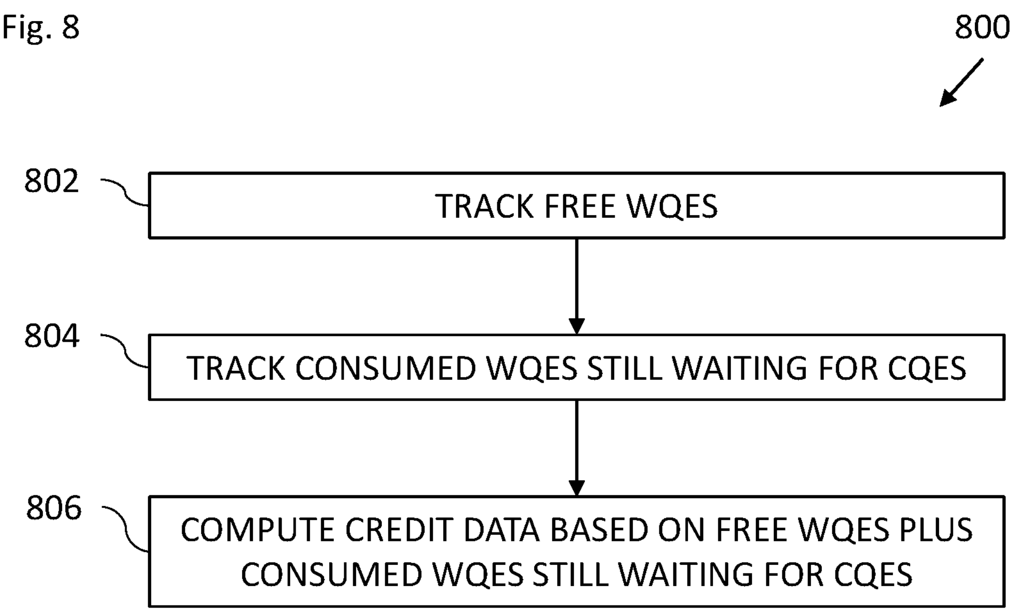
FIG. 8 is a flowchart including steps in a method to compute available WQEs in the system of FIG. 1.

Reference is now made to FIGS. 7 and 8. FIG. 7 is a view of receive work queue 500 used to illustrate computation of available WQEs 504 in the system 10 of FIG. 1. FIG. 8 is a flowchart 800 including steps in a method to compute available WQEs 504 in the system 10 of FIG. 1.

As previously mentioned, when an out-of-order message arrives, it consumes the first available WQE in the receive work queue 500 and the responder network device 14 scatters the data of the received out-of-order message into memory 38. However, the responder network device 14 cannot process a completion for the out-of-order message until the other message(s) (with lower MSNs) arrive and are completed in order. Therefore, in addition to the receive work queue 500 including free WQEs (arrow 702) (i.e., WQEs which have not been consumed by received messages), and WQEs associated with completion queue elements (CQEs) (arrow 704) (i.e., WQEs consumed with received messages and having associated CQEs), the receive work queue 500 also includes WQEs which are consumed with received messages and still waiting for associated CQEs (arrow 706). This leads to a performance problem based on how available credits are computed and could lead to the requestor device sending less packets than the responder device can handle.

For example, consider the receive work queue 500 which has eight WQEs (WQE1-8). Messages 1 and 2 are in the receive work queue 500, and have associated CQEs 502. Therefore, the MSN tracked by the responder network device 14 is equal to 2 (corresponding to message 2 with MSN 2). The responder network device 14 sends an acknowledgement receipt to the requestor network device 12 indicating that the MSN is equal to 2 and free credits are equal to 6. In such a case, the requestor network device 12 may compute that messages may be sent up to MSN 8.

Then message 4 arrives, but it is not processed as message 3 has not yet arrived. Therefore, message 4 consumes a WQE in the receive work queue 500 but does not have an associated CQE 502. If the responder network device 14 were to send an acknowledgement receipt at this stage based on the free WQEs only, it will include MSN equal to 2 and free credits equal to 5. In such a case, the requestor device may compute that messages may be sent up to MSN 7. So even though the MSN is the same, the free credits have been reduced by one, which would erroneously inform the requestor network device 12 that there is one less packet that can be transmitted than previously.

Therefore, packet processing circuitry 32 is configured to track free WQEs which are not consumed with messages (block 802), and track consumed WQEs still waiting for CQEs being WQEs consumed with messages and still waiting for CQEs to be generated for the consumed WQEs (block 804). The packet processing circuitry 32 is configured to compute available receive work queue credits based on free WQEs plus WQEs still waiting for CQEs (block 806). In the above example, the available credits after receiving message 4 will be equal to the amount of free WQEs (i.e., 5), plus the amount of WQEs which are consumed with received messages and still waiting for associated CQEs (i.e., 1) giving a total of 6 available credits. Therefore, the requestor device correctly computes that messages may be sent up to MSN 8 (i.e., MSN equal to 2 plus available credits of 6).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system comprising a first network device, which includes:

a host interface to receive messages from a host device;

a network interface to provide a connection to a second network device over a packet data network; and packet processing circuitry to:

prepare the messages for sending to the second network device over the packet data network;

send a batch of the messages to the second network device without waiting for an acknowledgement receipt from the second network device after sending each of the messages in the batch before sending a next one of the messages in the batch, one of the messages in the batch having a maximum message sequence number (MSN) of the batch;

receive a given acknowledgement receipt from the second network device indicating that all the messages in the batch have been received by the second network device and including credit data indicating that there is no space in a receive work queue of the second network device for receiving an additional message; and send the additional message having an MSN greater than the maximum MSN to the second network device responsively to receiving the given acknowledgement receipt and based on the credit data indicating that there is no space in the receive work queue of the second network device for receiving the additional message.

2. The system according to claim 1, wherein each of the messages in the batch of the messages consume work queue elements in a receive work queue of the second network device.

3. The system according to claim 1, wherein the packet processing circuitry is configured to receive a single acknowledgement receipt for all the messages in the batch.

4. The system according to claim 1, wherein the packet processing circuitry is configured to resend the additional message to the second network device intermittently.

5. The system according to claim 1, further comprising the second network device including:
- a network interface to provide a connection to the first network device over the packet data network; and
- packet processing circuitry to:
  - receive the messages from the first network device;
  - process the messages received from the first network device;
  - maintain a cyclic receive work queue including work queue elements (WQEs) that are consumed in order;
  - track available ones of the WQEs; assign the messages to the work queue elements so that the WQEs are consumed by the messages in an order that the messages are received by the second network device;
  - scatter the messages to a memory; and
  - generate completion queue elements (CQEs) for the WQEs and add the CQEs to a completion queue, wherein the CQEs provide the respective locations in the memory where respective ones of the messages were scattered.

6. The system according to claim 5, wherein the packet processing circuitry of the second network device is configured to:
- process the messages of the batch out-of-order, the messages of the batch including a first message and a second message, the first message having a lower MSN than the second message;
- receive the second message before the first message;
- assign the second message to a first one of the WQEs;
- scatter the second message to the memory;
- receive the first message;
- assign the first message to a second one of the WQEs; and
- scatter the first message to the memory.

7. The system according to claim 5, wherein the packet processing circuitry of the second network device is configured to process the messages of the batch in order so that if one of the messages is received out-of-order according to the MSN, the out-of-order message is dropped.

8. The system according to claim 5, wherein the packet processing circuitry of the second network device is configured to track consumed WQEs still waiting for CQEs, being ones of the WQEs consumed with ones of the messages and still waiting for CQEs to be generated for the consumed WQEs.

9. The system according to claim 8, wherein the packet processing circuitry of the second network device is configured to:
- track free WQEs which are not consumed with messages;
- compute credit data including available receive work queue credits based on the free WQEs plus the consumed WQEs still waiting for CQEs; and
- send the credit data to the first network device via the network interface.

10. The system according to claim 9, wherein the packet processing circuitry of the second network device is configured to:
- generate an acknowledgement receipt including the credit data and indicating that at least one of the messages has been received by the packet processing circuitry; and
- send the acknowledgement receipt to the first network device via the network interface.

11. The system according to claim 10, wherein the packet processing circuitry of the second network device is configured to generate the acknowledgement receipt to include a highest message sequence number (MSN) of the messages which have an associated one of the CQEs.

12. The system according to claim 9, wherein the packet processing circuitry of the second network device is configured to generate the CQEs for the WQEs according to an order of the MSNs of the messages that have consumed the WQEs.

13. The system according to claim 9, wherein the packet processing circuitry of the second network device includes:
- a first hardware counter configured to track the free WQEs; and
- a second hardware counter configured to track the consumed WQEs still waiting for CQEs.

14. A method, comprising:
- receiving messages from a host device;
- providing a connection to a network device over a packet data network;
- preparing the messages for sending to the network device over the packet data network;
- sending a batch of the messages to the network device without waiting for an acknowledgement receipt from the network device after sending each of the messages in the batch before sending a next one of the messages in the batch, one of the messages in the batch having a maximum message sequence number (MSN) of the batch;
- receiving a given acknowledgement receipt from the network device indicating that all the messages in the batch have been received by the network device and including credit data indicating that there is no space in a receive work queue of the network device for receiving an additional message; and
- sending the additional message having an MSN greater than the maximum MSN to the network device responsively to receiving the given acknowledgement receipt and based on the credit data indicating that there is no space in the receive work queue of the network device for receiving the additional message.

15. The method according to claim 14, wherein each of the messages in the batch of the messages consume work queue elements in a receive work queue of the network device.

16. The method according to claim 14, wherein the receiving the given acknowledgement receipt includes receiving a single acknowledgement receipt for all the messages in the batch.

17. The method according to claim 14, further comprising resending the additional message to the network device intermittently.

18. The method according to claim 14, further comprising, by the network device:
- receiving the messages;
- maintaining a cyclic receive work queue including work queue elements (WQEs) that are consumed in order;
- tracking available ones of the WQEs;
- assigning the messages to the work queue elements so that the WQEs are consumed by the messages in an order that the messages are received by the network device;
- scattering the messages to a memory; generate completion queue elements (CQEs) for the WQEs; and adding the CQEs to a completion queue, wherein the CQEs provide the respective locations in the memory where respective ones of the messages were scattered.

19. The method according to claim 18, further comprising, by the network device:

tracking consumed WQEs still waiting for CQEs, being ones of the WQEs consumed with ones of the messages and still waiting for CQEs to be generated for the consumed WQEs.

20. The method according to claim 19, further comprising, by the network device:

tracking free WQEs which are not consumed with messages;

computing credit data including available receive work queue credits based on the free WQEs plus the consumed WQEs still waiting for CQEs; and sending the credit data to a requestor network device.

21. The method according to claim 20, further comprising, by the network device:

generating an acknowledgement receipt including the credit data and indicating that at least one of the messages has been received; and sending the acknowledgement receipt to the requestor network device.

22. The method according to claim 21, wherein the generating the acknowledgement receipt includes generating the acknowledgement receipt to include a highest message sequence number (MSN) of the messages which have an associated one of the CQEs.

23. The method according to claim 20, wherein the generating the CQEs includes generating the CQEs for the WQEs according to an order of the MSNs of the messages that have consumed the WQEs.

24. The method according to claim 20, wherein the tracking the free WQEs is performed using a first hardware counter, and the tracking the consumed WQEs still waiting for CQEs is performed using a second hardware counter.

* * * * *